(No Model.)
E. ROYCE.
SOD CUTTER AND PULVERIZER.
No. 344,204. Patented June 22, 1886.
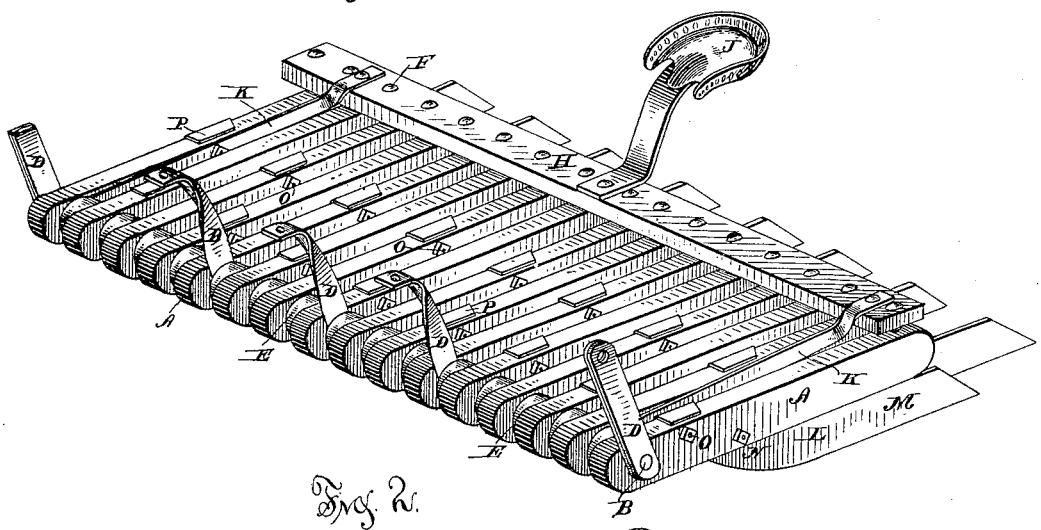
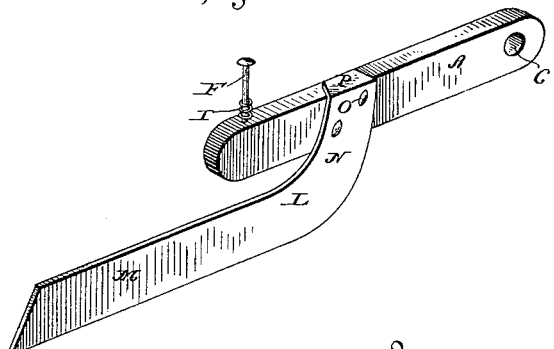
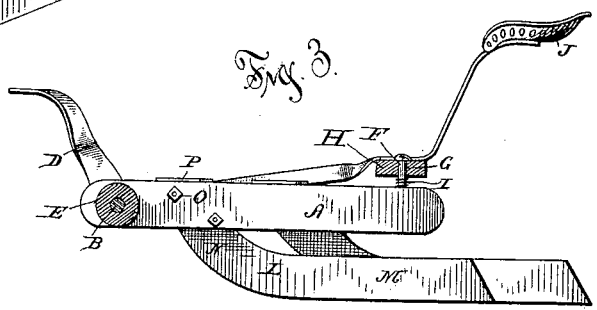
WITNESSES
F. L. Durand.
Edward Stanton
INVENTOR
Ezra Royce,
By Louis Bagger & Co.
Attorneys.

United States Patent Office.

EZRA ROYCE, OF PALISADE, DAKOTA TERRITORY.

SOD CUTTER AND PULVERIZER.

SPECIFICATION forming part of Letters Patent No. 344,204, dated June 22, 1886.

Application filed March 2, 1886. Serial No. 193,757. (No model.)

*To all whom it may concern:*

Be it known that I, EZRA ROYCE, a citizen of the United States, and a resident of Palisade, in the county of Minnehaha and Territory of Dakota, have invented certain new and useful Improvements in Sod Cutters and Pulverizers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved sod cutter and pulverizer. Fig. 2 is a similar view showing the manner of attaching the cutter-blades to one of the bars, and Fig. 3 is a vertical sectional view of the machine.

Similar letters of reference indicate corresponding parts in all the figures.

My invention has relation to implements for cutting plowed-up sod and for pulverizing the soil; and it consists in the improved construction and combination of parts of the same, as hereinafter more fully described and claimed.

In the accompanying drawings, the letters A indicate a number of bars, which are pivoted at their forward ends upon a rod, B, which passes through perforations C in the forward ends of the bars, and arms D are pivoted to the ends of this rod and at several points upon the rod, serving as means for attaching the implement to the frame of a seeding-machine or similar wheeled frame. Washers E are interposed upon the rod between the ends of the bars, spacing the same, and the rear ends of the bars are provided with short upright rods F, which slide in vertical perforations G in a beam, H, parallel to the rod, which beam rests upon the rear ends of the bars, having coiled springs I interposed between its under side and the upper sides of the rear ends of the bars, and wrapped around the rods, so that the bars and the beam will be cushioned against each other. The seat J for the driver is preferably secured upon this spring-cushioned beam, and two arms, K K, are secured at their rear ends to the beam, and are pivoted at their forward ends upon the rod near the ends of the same.

Cutter-blades L, consisting of rearwardly-extending straight portions M and upwardly-curved forward portions N, are secured to the sides of the bars, having bolts O passing through the upper portions of them and through the bars, and having their uppermost ends bent over the upper sides of the bars, forming flanges or lips P, and these cutter-blades are alternately secured at the forward ends of the bars and near their middles, so that they form two transverse rows or series of blades alternating. The edges of these cutter-blades are sharpened, and it will be seen that by dragging the implement across the turned-up furrows of sod in a field the blades will cut the sod, so that it will easily be still more subdivided and pulverized, and the blades having the upwardly-curved forward ends will not drag any tufts of grass or grass-roots, weeds, or other rubbish, but will allow all such rubbish to slip under it, and thus be cut and put in condition for decaying. The cutters will also prove effectual in breaking clods and pulverizing them, as the rounded ends of the forward row of cutters will first cut the clods into larger portions, whereupon the rear row will, together with the rear portions of the forward row of cutters, cut and break the clods, so that all clods will be cut or broken by the implement and the ground be perfectly pulverized. The bars being pivoted to the rod, and having their rear ends bearing against the springs and sliding with their rods in the perforations of the seat-bearing bar or beam, each bar may be raised separately for the purpose of slipping over a stone or similar obstruction without interfering with the operation of the other bars and cutters, and the beam may be connected to the wheeled frame in any suitable manner by chains or similar means, so that the implement may be raised off from the ground when it is desired to allow it to slip over a portion of ground without touching it.

Having thus described my invention, I claim and desire to secure by Letters Patent of the United States—

1. In a sod cutter and pulverizer, the combination of a frame with a number of rearwardly-curved cutter-blades secured alternately near the forward edge of the frame and near the middle of the frame, with their upwardly-curved forward ends, and having their horizontal portions projecting rearward, as and for the purpose shown and set forth.

2. In a sod cutter and pulverizer, the combination of a rod having means for attaching it to a wheeled frame, a number of bars pivoted with their forward ends upon the rod, and having upwardly-projecting rods at their rear ends, and provided with cutter-blades upon their under sides, a number of washers interposed between the bars upon the rod, a beam secured to the rod by means of arms pivoted upon the rod at their forward ends, and having a number of vertical perforations for the upright rods of the bars, and a number of coiled springs placed around the rods between the rear ends of the bars and the under side of the beam, as and for the purpose shown and set forth.

3. In a sod cutter and pulverizer, the combination of a rod having arms pivoted upon it for attaching it to a wheeled frame, a number of bars pivoted with their forward ends upon the rod, and having upwardly-projecting rods upon their rear ends, and having rearwardly-curved cutter-blades secured to their sides by the upwardly-curved forward ends alternately near the forward ends and at the middles of the bars, a beam secured to the rod by means of arms pivoted to the rod at their forward ends, and having a number of vertical perforations for the upright rods and bearing the seat for the driver, and a number of coiled springs placed around the upright rods between the bars and the beam, as and for the purpose shown and set forth.

4. In a sod-cutter, the combination of a bar pivoted at its forward end with a cutter-blade having its forward end curved upward, and having its uppermost end bent to form a lip or flange having bolts passing through the blade and through the bar, as and for the purpose shown and set forth.

In testimony that I claim the foregoing as my own I have hereunto affixed my signature in presence of two witnesses.

EZRA ROYCE.

Witnesses:
FRANK C. BELL,
JOHN STEINMETZ.